Dec. 23, 1969
J. M. SHEESLEY
3,485,139
CENTER BAR ROTARY MOTOR
Original Filed June 2, 1966
5 Sheets-Sheet 1
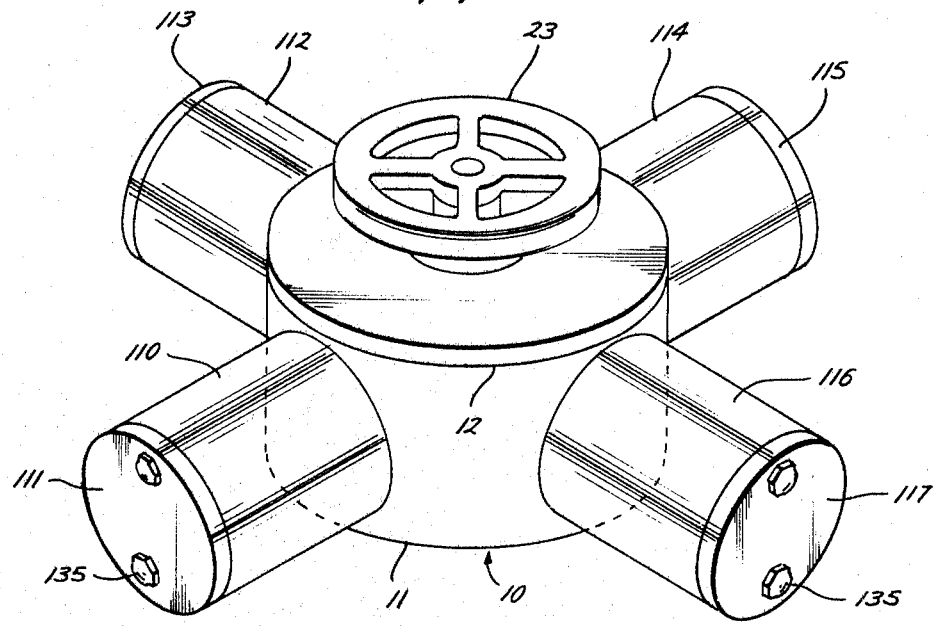
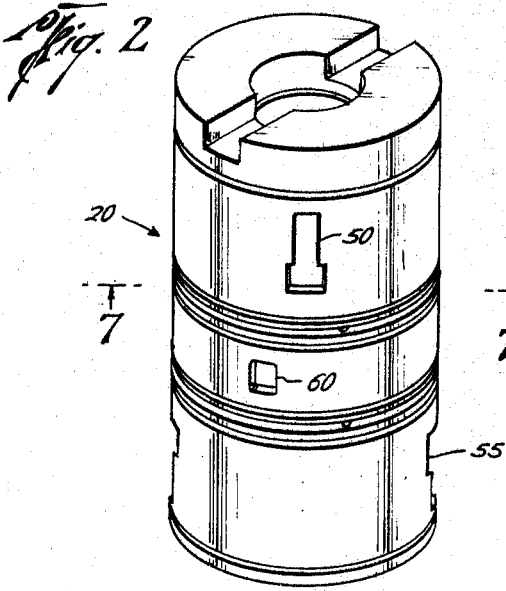
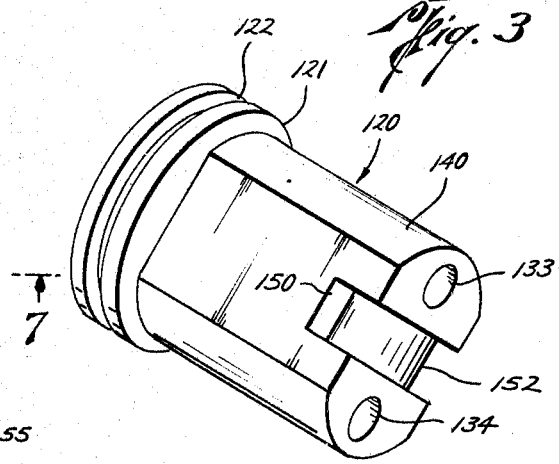
John M. Sheesley
INVENTOR.
BY Robert W B Dickerson
ATTORNEY Dec. 23, 1969

J. M. SHEESLEY 3,485,139

CENTER BAR ROTARY MOTOR

Original Filed June 2, 1966

John M. Sheesley
INVENTOR.

BY Robert W B Davidson

ATTORNEY

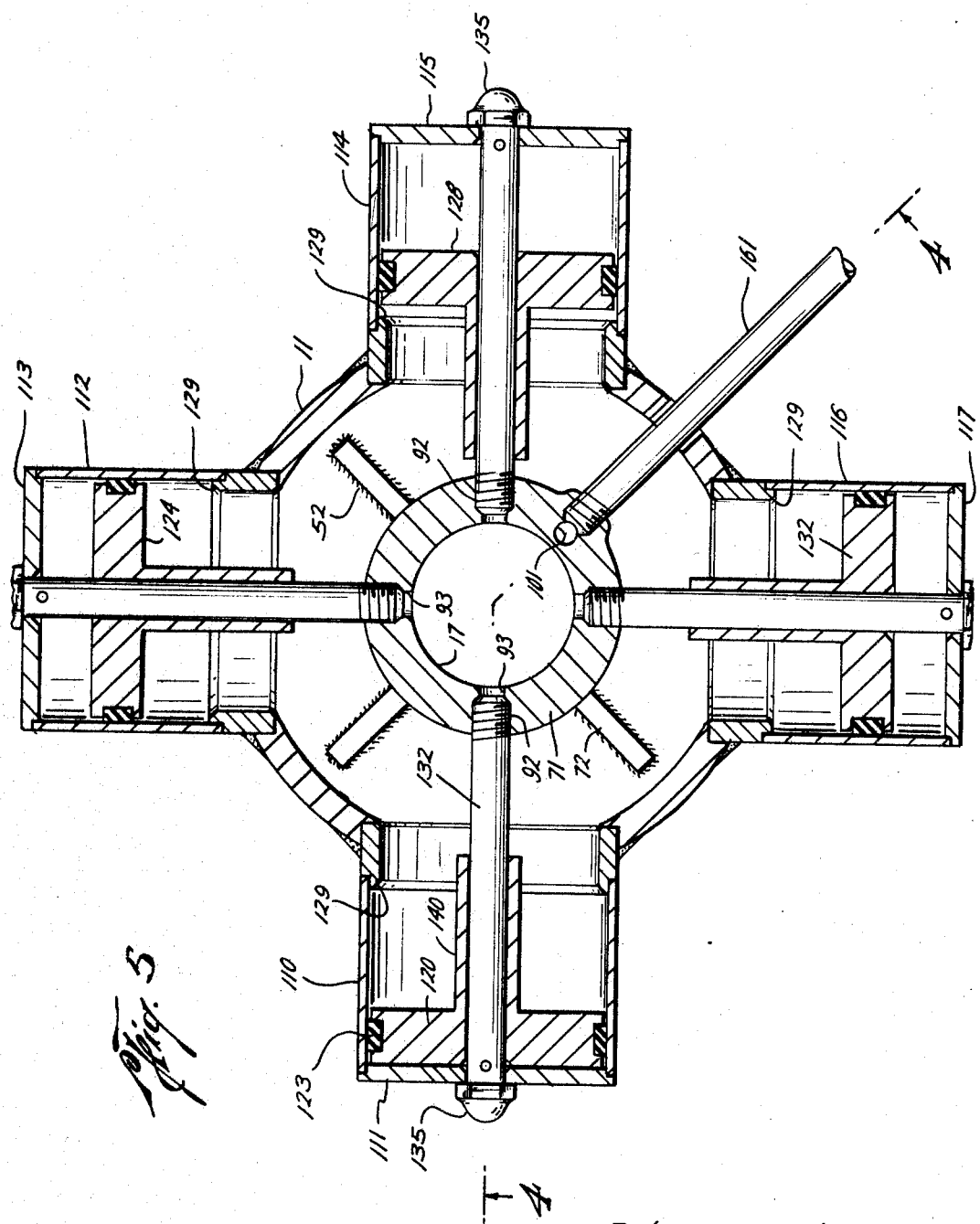

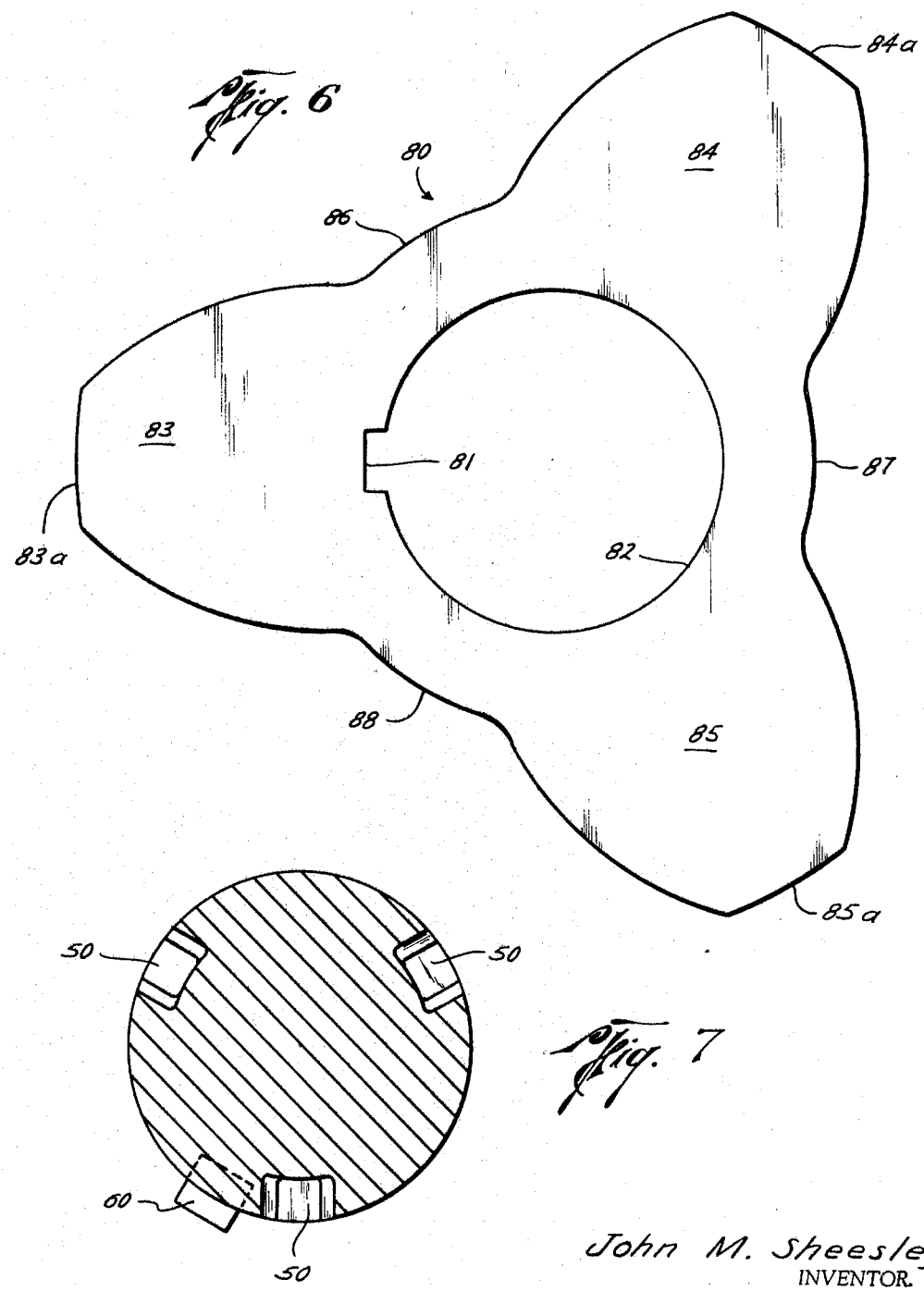

Dec. 23, 1969    J. M. SHEESLEY    3,485,139
CENTER BAR ROTARY MOTOR
Original Filed June 2, 1966    5 Sheets-Sheet 5
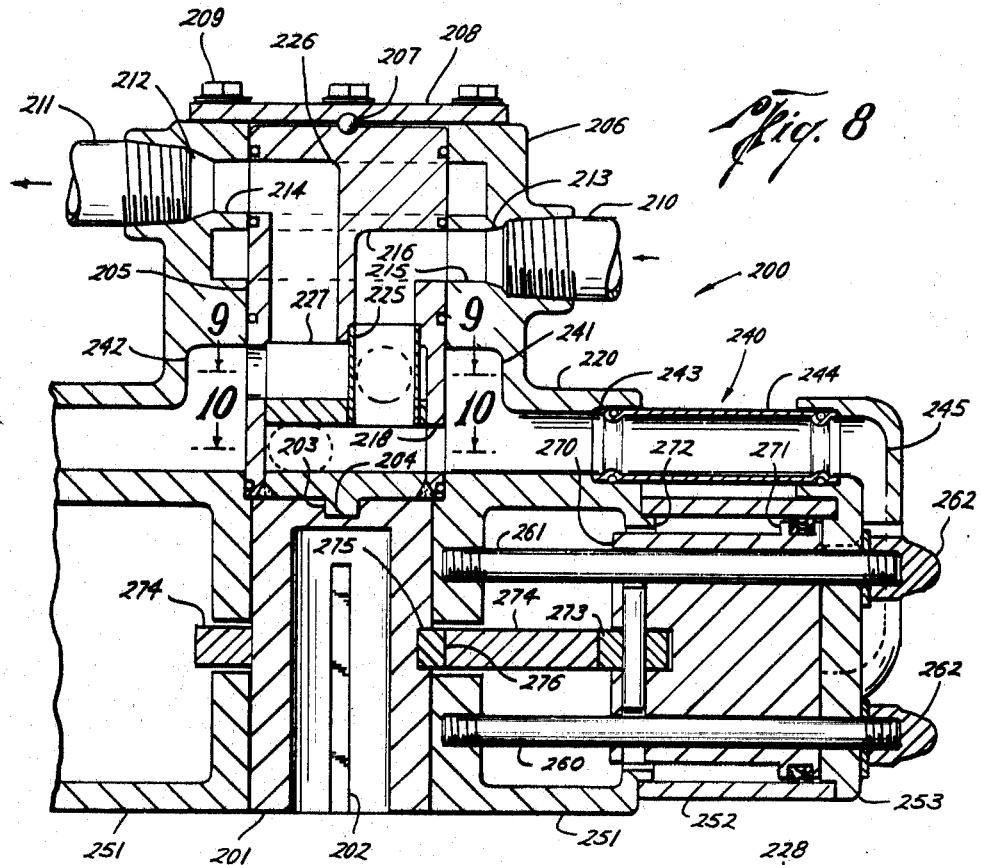
Fig. 8
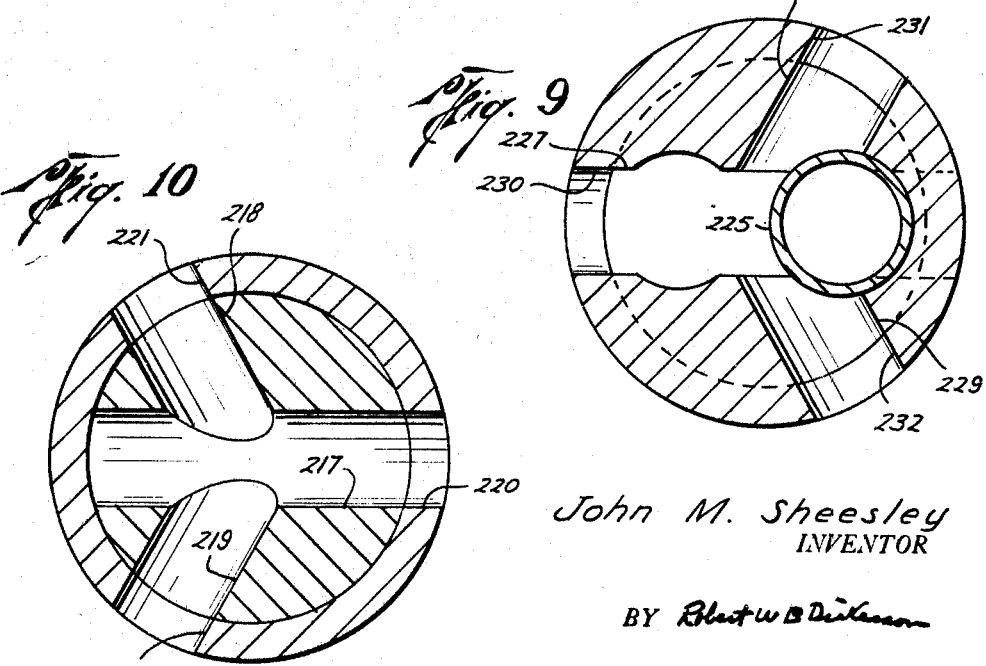
Fig. 10
Fig. 9
John M. Sheesley
INVENTOR
BY Robert W B Dickerson
ATTORNEY United States Patent Office 3,485,139
Patented Dec. 23, 1969

3,485,139
CENTER BAR ROTARY MOTOR
John M. Sheesley, P.O. Box 9365,
Houston, Tex. 77001
Continuation of application Ser. No. 554,824, June 2, 1966. This application July 1, 1968, Ser. No. 750,674
Int. Cl. F01l 33/02; F15b 3/10; F01b 1/06
U.S. Cl. 91—180                                        3 Claims

ABSTRACT OF THE DISCLOSURE

This operator has a central housing containing a valve stem engaging rotatable member. Equally spaced piston-containing cylinders are each linked to the housing by a pair of hollow tie bars joined to one end of said cylinders, passing internally therethrough to join the housing. Pistons ride on these tie bars and may force against ears of a device linked to the rotatable member to cause its rotation. Reciprocation of the piston is caused by hydraulic fluid from a source, passing through the rotatable member, through one of the hollow tie bars to bear against the piston. Fluid is exhausted, at the other end of each cycle, through the other hollow tie bar, the rotatable members and out an exhaust port.

---

This application is a continuation of application Ser. No. 554,824, June 2, 1966.

This invention concerns a new and useful operator which may be used to rotate a shaft.

More particularly it concerns a hydraulically actuated, cam driven motor utilized to rotate the shaft or stem of a valve member.

Oftentimes industrially utilized valves require substantial torque to be exerted in order to be operative, whether the valves be gate-type, plug valves or the like. Power means have been developed, including fluid motors, engageable with the valve stem for operation of the valve. An example of such means is described in my U.S. Patent 3,203,318.

The apparatus of this invention provides means for engaging a valve stem. Fluid is provided from exterior sources, liquid or compressed air being contemplated, said fluid being caused to rotate a cam wheel, which wheel is operatively connected to a valve stem rotating mechanism. Space pistons provide the means whereby said cam wheel is caused to rotate. Plural conduits are provided whereby the entry and exhaust conduits may have their function reversed without disrupting the operativeness of the operator. Normally-disengaged handle means are further contemplated to render the operator effective in the event of the disruption of fluid supply. Tie bars may be utilized to not only unify the operator and to counteract side thrust generated by the pistons, but also may serve as fluid conduits. In the event that extremely high fluid pressures are used, exterior porting may be preferable to using the tie rods as fluid conduits.

Thus, this invention has an object the provision of a means for rotating a valve stem or other equipment.

A further object is the provision of a device whereby the means for linking together the various components may further serve as fluid conduits.

Another object is providing means for mechanically rotating a valve stem with alternate hand operative means engageably associated with the rotating means.

These and other objects and benefits will become apparent on considering the following description and drawings in which:

FIGURE 1 is a perspective of the operator, and handle attached thereto;

FIGURE 2 is a perspective of the combination cam wheel positioning and fluid guide apparatus;

FIGURE 3 is a perspective of one of the pistons;

FIGURE 5 is a horizontal section taken along lines 5—5 of FIGURE 4;

FIGURE 6 is an elevation of the cam wheel;

FIGURE 7 is a horizontal section taken along lines 7—7 of FIGURE 2;

FIGURE 8 is a vertical section through a modification, similar to FIGURE 4;

FIGURE 9 is a section taken along lines 9—9 of FIGURE 8; and

FIGURE 10 is a section taken along lines 10—10 of FIGURE 8.

Figure 4:
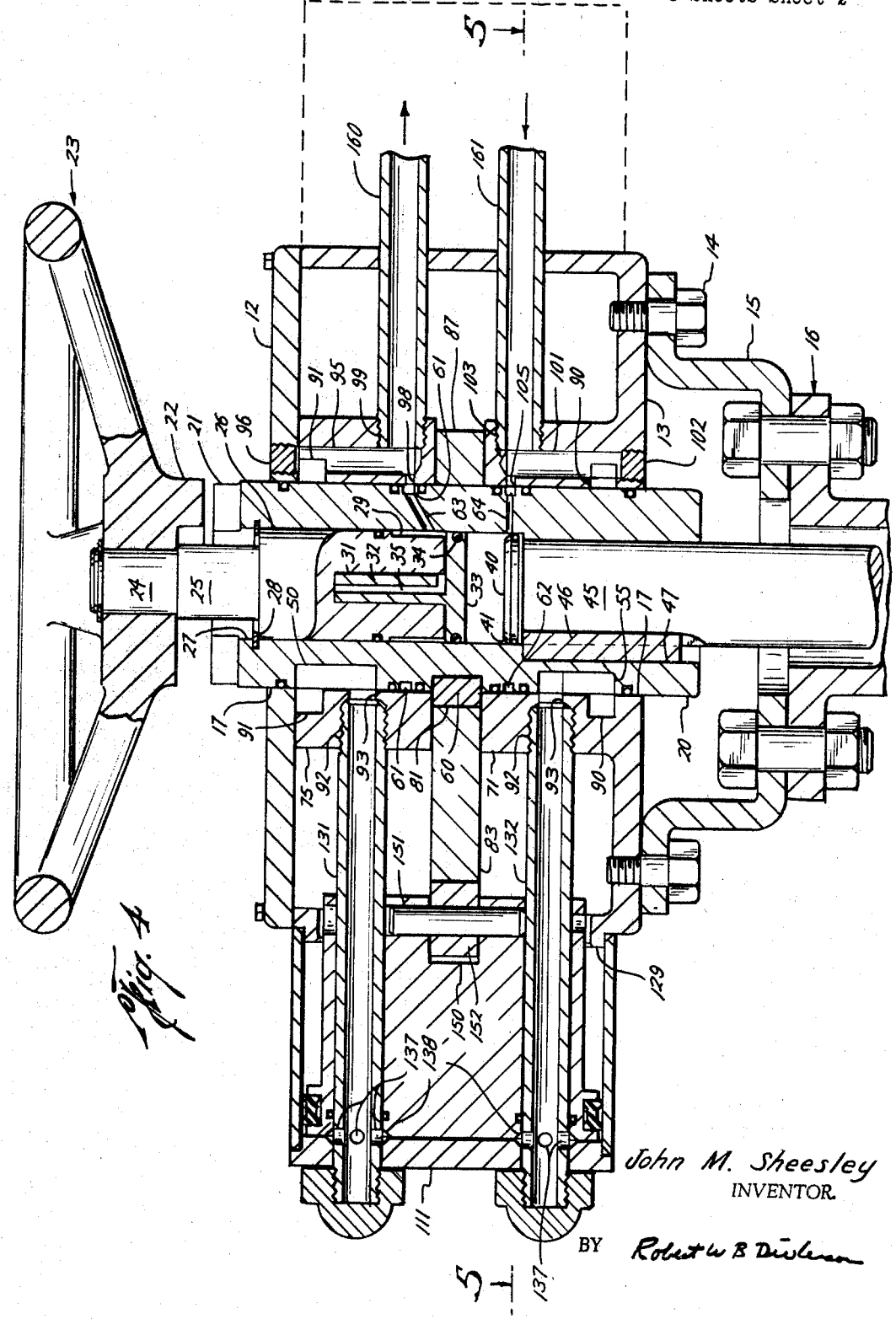
FIGURE 4 is a vertical section taken along lines 4—4 of FIGURE 5.

Looking first at FIGURES 1, 4 and 5, housing 10 includes cylinder 11, top cover 12 and bottom plate 13. Affixed to plate 13, as by bolts 14, is bonnet 15, which bonnet may be linked to generalized valve housing 16.

Means are provided, interior of housing 10, for receiving a valve stem, a handle shaft, as well as means for directing the flow of incoming and outgoing fluids. The housing, including cylinder 11 and top and bottom cover plates 12 and 13 respectively, is vertically apertured at 17. Generally cylindrical core 20 is inserted within said housing aperture. A portion of the core is seen to extend upwardly of cover plate 12, and is slotted at 21 for receiving key or notch 22 of handle assembly 23. Said handle assembly includes shaft 24, the upper portion of which is reduced in diameter, the central portion 25 being of intermediate diameter and the lower portion 26 being received within bored, drilled, or otherwise formed passageway 27 through core 20. While shaft 24 is movable within passageway 27, upward motion is limited by virtue of a snap ring 28. Lower portion 26 of shaft 24 is annularly milled at 29 to form a cavity between it and the interior wall of core 20 for a purpose hereinafter described. Further aperture or slot 31 is formed in said portion 26 for receiving the upstanding stem 32 of a plug, said plug having a base 33 slidably moving within cavity 27, an O ring 34 being provided for sealing purposes. Upstanding stem 32 includes conduit 35 leading from its uppermost surface to an exit adjacent base 33. A retaining disc 40 is fixed to limit downward motion of said plug, said disc having a beveled surface 41. The stem 45 of a valve is shown, said stem being keyed at 46 for receipt within and positioning relative to slot 47 formed interiorly of core 20.

The core includes a series of three spaced inverted T-shaped slots 50 on its outer periphery, near its upper surface, and a similar grouping 55 near its lower surface, the cross bar of the T being lowermost in the 50 series and uppermost in the 55 series. Further, each of the slots 55 would be positioned intermediate and below adjacent slots 50, i.e., slots 55 are rotated one-half the distance between adjacent slots 50. The number of such slots may be varied depending on the number of cammed surfaces used in conjunction therewith. A lug 60 extends outwardly of its center for affixing a cam wheel thereto. Above and below said lug annular grooves 61, 62 are formed in the outer surface of core 20, sealing rings being provided above and below said grooves. Fluid passageway 63 through core 20 is seen to communicate between groove 61 and the cavity between milled portion 29 of shaft portion 26 and the interior wall of core 20. A further passageway 64 communicates between groove 62 and the interior cavity of core 20, adjacent beveled surface 41 of disc 40.

Bottom plate 13 is seen to have integral therewith, upstanding cylindrical hollow skirt portion 71, which may be supported by wedges 72. The lowermost reaches of core 20 are received by the central perforation through said skirt portion. Annular collar 75 is positioned just underneath and adjacent to cover plate 12. Of course, said collar may be made integral with plate 12. Intermediate collar 75 and skirt 71, cam wheel 80 is joined to core 20 by virtue of slot 81 having lug 60 of core 20 nesting therein. Thus, cam wheel 80 is rotatable along with core 20. The cam wheel is seen to have central aperture 82, and a plurality of spaced ears 83 84, 85, each of which present opposed cam surfaces joined by a slightly arcuate edge, 83a, 84a and 85a, respectively, and each ear is linked to an adjacent ear lug one of curved surfaces or perigees 86, 87 and 88.

Skirt 71 and collar 75 are annularly recessed at 90 and 91 respectively for communication with T slots 55 and 50 as hereinafter described. Further, a plurality of, herein four, spaced pairs of threaded bores 92 are provided for receiving tie bars, said bores communicating, by means of reduced-in size fluid passages 93, with the horizontally elongated portion of T slots 50 and 55 in core 20. Vertical conduit 95 extends upwardly through collar 75 and cover plate 12, to be closed at the top by plug 96, said conduit 95 extends upwardly through collar 75 and cover plate 12, to be closed at the top by plug 96, said conduit 95 communicating with threaded further aperture 99 in said collar, with annular recess 91 in said collar and with annular groove 61 in bore 20, the latter by virtue of aperture 98. A further vertical conduit 101, similar to 95, extends upwardly in skirt 71, being plugged by member 102 to communicate with threaded aperture 103, annular recess 90 as well as with annular groove 62 in core 20 by virtue of aperture 105.

A group of cup-like cylinders 110, 112, 114 and 116 are affixed to lips 129 geometrically provided on the outer wall of housing portion 11, as best shown by FIGURE 5. Each of members 110, 112, 114 and 116 has one end sealed by closures 111, 113, 115, and 117, respectively.

Each of said cylinders includes within its chamber one of pistons 120, 124, 128 and 132, one of such pistons being shown in FIGURE 3. Each piston includes a head, such as 121, said head being grooved as at 122 for receiving sealing material such as 123. Further, each piston is slidably mounted on tie bars such as rods 130, 131 passing through bores 133 and 134. Said tie rods are fixed at one end, as by fasteners 135 to the closures such as 111 of the respective cylinders 110, 112, 114 and 116. Each of the eight described tie rods is also threadedly received at its other end within threaded apertures 92 spaced around collar 75 and skirt 71, respectively. Each of said tie rods includes oppositely disposed passageways 137 communicating with a cavity defined by beveled surface 138 on the piston body and similar beveling on the interior of cover plates 111, 113, 115 and 117. Outward motion of the pistons is obviously limited by the closures of the respective cylinders, and inward motion by shoulders on lips 129 of the housing. Inwardly of piston heads, such as 121, projections, such as 140, which includes most of bores 133 and 134, are notched at 150 to receive shaft 151 around which rides cam 152, which cam rides along surfaces of cam wheel 80 during operation of the device.

Additionally, inlet and outlet conduits 160 and 161, which may be reversed if desired, are threadedly engageable at one end with threaded apertures 99 and 103 of the collar 75 and skirt 71, respectively. The other end of said conduits 160, 161 leading to a fluid reservoir and power source.

Consider now the operation of the device. Although either of conduits 160, 161 may serve as inlets or outlets, fluid motion will be described in terms of the direction assumed by the arrows of FIGURE 4. Fluid under pressure from a source not shown would enter and pass through member 161, exiting within the chamber defined by conduit 101. At this point, a portion of said pressurized fluid would pass through aperture 105, around annular groove 62, which groove permits, by virtue of passageway 64, said portion of fluid to enter the cavity of rotatable bore 20 and thereby exert an upward force against plug base 33, which plug nests within slot 31 of the handle shaft. This action restrains the handle's key 22 from being operatively connected to stem rotating core 20 when a motive fluid is being provided. Of course, in the absence of fluids, said key may be inserted within core slot 21 for valve stem rotation. In the event that conduit 160 were the inlet, a portion of the incoming fluids would enter the cavity 95, through aperture 98 around annulus 61 in the core and through passageway 63 whereupon by virtue of milled surface 29 said fluids may force the plug out of engagement with the handle shaft, pass upwardly through conduit 35 in plug stem 32 to restrain the handle in a disengaged position by exerting force against the uppermost surface of slot 31. Returning now to the scheme depicted in FIGURE 4, incoming fluids would further move downwardly within vertical conduit 101 in fixed skirt portion 71, to annular recess 90. Inasmuch as said annular recess is always in communication with the lower portion of rotating T slots 55, fluid will pass through said slots and into the central chamber of tie bars 132 as the cross bars of said slots begin to come into alignment with apertures 93 adjacent said bars 132. At this point it should be noted that the extra width of the slot cross bar permits a small amount of fluid pressure to be exerted against the pistons within adjacent cups such as 110, 112 in order to provide a continuity of motion. On alignment, then of a T slot and passageway 93, fluid will move through a tie bar 132, pass outwardly thereof through apertures 137, exert a force first against beveled surface 138 of the piston body and thereafter force the piston inwardly. Cam 152 will press against one of the ears of cam wheel 80, as for example the trailing edge of ear 83 of FIGURE 6. Such action will cause rotation of said cam wheel and thereby of core 20 and an attached valve stem. When a piston such as that riding within cup 110 has moved to its innermost position with seal 123 adjacent lip 129, its cam will be resting against one of the cam wheel arcuate surfaces such as 88. During the piston's inward motion, fluid may enter apertures 137 in tie rod 131, pass therethrough as well as through conduit 93. As it approaches this perigee the cross bar of one of T slots 50 will begin to be aligned with conduit 93 whereby fluids may pass upwardly through said T slot into annulus 91, down through cavity 95 and out the outlet means 160. On removal of the fluid pressure, an ear, such as 85 of the cam wheel, will press outwardly on the piston cam causing said piston to move outwardly toward its initial position resting with its cam riding on an arcuate surface such as 85a of the cam wheel. The path followed by any given piston will be moving inwardly under fluid pressure and pressing against the trailing edge of a cam wheel ear thereby rotating the cam wheel until the piston's perigee is reached at an arcuate surface such as 88; evacuation of pressure fluids while the piston cam rides along said arcuate surface; outward motion by virtue of pressure exerted against the piston cam by the leading edge of the next adjacent cam wheel ear; and riding along an outward surface of a cam wheel ear, such as 83a until fluid is again supplied under pressure to repeat the cycle. Thus, each of the four pistons exerts a pressure tending to turn the cam wheel, and a related valve stem, as each of the cam wheel ears passes said pistons. Further, if motivating fluid is not desirable or unavailable, alternate head operable means 23 is engageable with core 20 to rotate the valve stem.

A modification of the device is indicated generally at 200 and is shown in FIGURES 8, 9 and 10. In this embodiment, only one of the piston-containing cylinders being shown, the tie rods do not serve as porting mechanisms as in the embodiment of FIGURE 4. This actuator embodiment is indicated generally at 200. A valve stem-engaging member 201 is notched at 202 for receipt of a valve stem key. Member 201 is also slotted at 203 for receiving and fixing thereto, lug 204 of rotatable core 205. Said core is received within dome 206 of housing 220, and is rotatable with respect thereto by virtue of ball type bearing 207, a cover 208 being sealingly engaged with said housing by virtue of means such as bolts 209. Input and output means 210 and 211, respectively, may be threadedly engageable with dome 206, communicating bores 212 and 213 providing communication between said input-output means and annuli 214 and 215. "L" shaped aperture 216 connects annulus 215 with a trifurcated conduit toward the lower reaches of core 205, said conduit having legs or bores 217, 218 and 219. Leg 217 is open at one end 220, while legs 218 and 219 branch from leg 217 and are open at their respective opposite ends 221 and 222. Upwardly of said conduit, aperture 216 is encircle by sleeve 225. Further L shaped aperture 226 connects annulus 214 with a second trifurcated conduit upwardly in core 205 from legs 217, 218 and 219. Said second conduit has angularly related legs 227, 228 and 229. Leg 227 is open at one end 230, while legs 228 and 229 branch from leg 227 and are open at their respective opposite ends 231 and 232.

Housing 220 has affixed thereto, similar to the embodiment of FIGURE 5, a plurality, preferably four, of piston containing cylinders. Only one such cylinder is shown in FIGURE 8, and illustrated generally by numeral 240. Above each cylinder, an L slot, such as 241 and 242, in housing 220 have one end, such as 243, opening into fluid passageway 244, said passageway communicating at its end opposite slot 241 with further fluid passageway 245 which leads to the interior chamber of cylinder 240. Each of said cylinders includes block portion 251, cup 252 and end cover plate 253, said latter members being fixed together by tie rods 260 and 261 and nuts 262. Piston 270 is slidingly engageable with said tie rods and has its inward motion limited by the interaction of piston lug 271 and block lug 272. Further the piston includes cam 273, similar to FIGURE 3, which cam rides along an exterior surface of cam wheel 274, said cam wheel, like that of FIGURE 6 and being affixed to valve stem engaging member 201, a lug 275 on member 201 fitting within slot 275 of cam wheel 274.

Operation of this embodiment is quite similar to that of FIGURES 1-7. Fluids enter through inlet 210, through bore 213 and into annulus 215, downwardly through aperture 216 of rotatable core 205, through sleeve 225 and outwardly through one of legs 217, 218 or 219 which is in communication with a slot 241 which leads to one of cylinders 240, through passageways 244, 245 and into the internal cavity of said one of said cylinders wherein the piston 270 is pushed inwardly, causing cam 273 to press against cam wheel 274 causing same to rotate along with core 205 and an associated valve stem affixed to member 201 by virtue of slot 202. Another of cylinders 240 not operatively, at the moment, connected to inlet 210, will have its piston pushed radially outward by cam wheel 274, whereby fluids will pass inwardly and upwardly through L slot 242 (see the left side of FIGURE 8) into a leg such as 227 upwardly through aperture 226, to be exhausted through outlet 211. Obviously input and output members 210 and 211 could have their function reversed without affecting the invention. As the core rotates one of the piston containing cylinders will be operatively linked with inlet 210, while the oppositely disposed cylinder will be connected with outlet or exhaust 211. By virtue of the conduit arrangement shown in FIGURES 9 and 10, adjacent pistons will be acted on consecutively, resulting in continuous operation of the rotatable valve stem engaging portion while fluid is being supplied under pressure.

What is claimed is:
1. Apparatus for rotating a shaft, including:
central housing means;
a plurality of hollow cylinders affixed to and positioned around said housing;
shaft engageable core member means rotatably positioned within said housing;
piston means reciprocably positioned within each of said cylinders, and a plurality of tie rod means within each of said cylinders, each of said tie rod means slidably supporting one of said piston means as well as joining one of said cylinders to said housing;
cam wheel means, having a plurality of ears, linked to said core member;
cam means joined to each of said piston means and adapted to exert a force against said cam wheel means;
upper and lower groupings of slots in the exterior surface of said core member;
upper and lower annular recesses in said housing, each of said recesses being positioned adjacent a portion of one of said upper or lower of said slot groupings;
first conduit means for providing a source of pressurized activating fluid to one of said annular recesses;
second conduit means for exhausting said activating fluid from the other of said annular recesses;
means for conducting said activating fluid, during the inward piston stroke, from one of said slot groupings in said core to a position adjacent one piston face in each of said cylinders, thereby causing such piston to exert a force against said cam wheel; and
means for conducting said activating fluid, during the outward piston stroke, from each of said cylinders to the other of said slot groupings.

2. The apparatus of claim 1 wherein each of said means for conducting said activating fluid include passageway means through one of said tie rod means in each of said cylinders, and each of said tie rod means in each of said cylinders has an open end positioned adjacent the path traversed by one of said slot groupings.

3. The apparatus of claim 1 and including means for manually rotating said core member, said manual rotating means being disengageably attachable to said core member; and means passing through said core and communicating with at least one of said first and second conduit means to cause said manual rotating means to be disengaged from said core member when said activating fluid is supplied to said apparatus but to be engageable with said core member when said activating fluid is not so supplied.

References Cited

UNITED STATES PATENTS

| 717,445 | 12/1902 | Nestius | 91—180 |
| 1,924,423 | 8/1933 | Svenson | 91—180 |
| 2,910,047 | 10/1959 | Plummer | 92—166 |
| 3,217,604 | 11/1965 | Khox | 91—391 |
| 3,217,604 | 11/1965 | Knox | 91—391 |

FOREIGN PATENTS 253,219  6/1926  Great Britain.

PAUL E. MASLOUSKY, Primary Examiner

U.S. Cl. X.R.

91—183, 391; 92—72, 166